(12) United States Patent
Sarmenta et al.

(10) Patent No.: US 8,990,370 B2
(45) Date of Patent: Mar. 24, 2015

(54) METHOD AND APPARATUS FOR PROVIDING INFORMATION COLLECTION USING TEMPLATE-BASED USER TASKS

(75) Inventors: Luis Sarmenta, Menlo Park, CA (US); Deepti Chafekar, Sunnyvale, CA (US); Juong-Sik Lee, San Jose, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/328,238

(22) Filed: Dec. 16, 2011

(65) Prior Publication Data
US 2013/0159040 A1 Jun. 20, 2013

(51) Int. Cl.
G06F 15/173 (2006.01)
G06Q 10/06 (2012.01)

(52) U.S. Cl.
CPC .................................. *G06Q 10/06* (2013.01)
USPC ............. 709/223; 705/7.15; 705/37; 715/744

(58) Field of Classification Search
None
See application file for complete search history.

(56) References Cited

U.S. PATENT DOCUMENTS

| | | | |
|---|---|---|---|
| 5,875,431 A * | 2/1999 | Heckman et al. | 705/7.16 |
| 7,130,885 B2 * | 10/2006 | Chandra et al. | 709/206 |
| 7,628,704 B1 | 12/2009 | Uhlir et al. | |
| 7,818,372 B1 * | 10/2010 | Cutrell et al. | 709/204 |
| 8,005,697 B1 | 8/2011 | Cohen et al. | |
| 8,874,477 B2 * | 10/2014 | Hoffberg | 705/37 |
| 2002/0042718 A1 * | 4/2002 | Jett | 705/1 |
| 2002/0049727 A1 * | 4/2002 | Rothkopf | 707/1 |
| 2002/0138582 A1 * | 9/2002 | Chandra et al. | 709/206 |
| 2002/0199187 A1 * | 12/2002 | Gissin et al. | 725/32 |
| 2004/0093261 A1 * | 5/2004 | Jain et al. | 705/10 |
| 2004/0210661 A1 * | 10/2004 | Thompson | 709/228 |
| 2007/0121152 A1 * | 5/2007 | CupChoy et al. | 358/1.15 |
| 2007/0168870 A1 * | 7/2007 | Wada | 715/741 |
| 2007/0212669 A1 | 9/2007 | Counts et al. | |
| 2008/0183532 A1 * | 7/2008 | Barnard et al. | 705/7 |
| 2008/0303811 A1 * | 12/2008 | Van Luchene | 345/419 |
| 2009/0054123 A1 | 2/2009 | Mityagin et al. | |
| 2010/0023259 A1 | 1/2010 | Krumm et al. | |
| 2010/0178985 A1 | 7/2010 | Chickering et al. | |
| 2010/0198814 A1 | 8/2010 | Petersen et al. | |

(Continued)

FOREIGN PATENT DOCUMENTS

| | | | |
|---|---|---|---|
| JP | 2002-143564 A | 5/2002 | |
| WO | WO 2009/073268 A2 | 6/2009 | |

OTHER PUBLICATIONS

Stock, Oliviero, et al. "Adaptive, intelligent presentation of information for the museum visitor in PEACH." User Modeling and User-Adapted Interaction 17.3 (2007): 257-304.*
Von Ahn, Luis, and Laura Dabbish. "Designing games with a purpose."Communications of the ACM 51.8 (2008): 58-67.*

(Continued)

*Primary Examiner* — Gurkanwaljit Singh
(74) *Attorney, Agent, or Firm* — Dittahavong & Steiner, P.C.

(57) ABSTRACT

An approach is provided for providing information collection using template-based user tasks. The collection platform processes and/or facilitates a processing of partial information for insertion into one or more task templates to cause, at least in part, creation of one or more user tasks to verify, to extend, or a combination thereof the partial information according to one or more system requirements for information. Next, the collection platform causes, at least in part, a distribution of the one or more user tasks based, at least in part, on the one or more system requirements, history information relating to participation of one or more users, or a combination thereof.

20 Claims, 16 Drawing Sheets

(56) References Cited

U.S. PATENT DOCUMENTS

2010/0269049 A1* 10/2010 Fearon .......................... 715/744
2010/0293108 A1* 11/2010 Gurvitch et al. ............ 705/36 R
2011/0087685 A1    4/2011 Lin et al.
2013/0073398 A1*  3/2013 Levy et al. ................. 705/14.72

OTHER PUBLICATIONS

Notification of Transmittal of the International Search Report and the Written Opinion of the International Searching Authority, or the Declaration for International Application No. PCT/FI2012/051226, dated May 30, 2013, pp. 1-14.

* cited by examiner

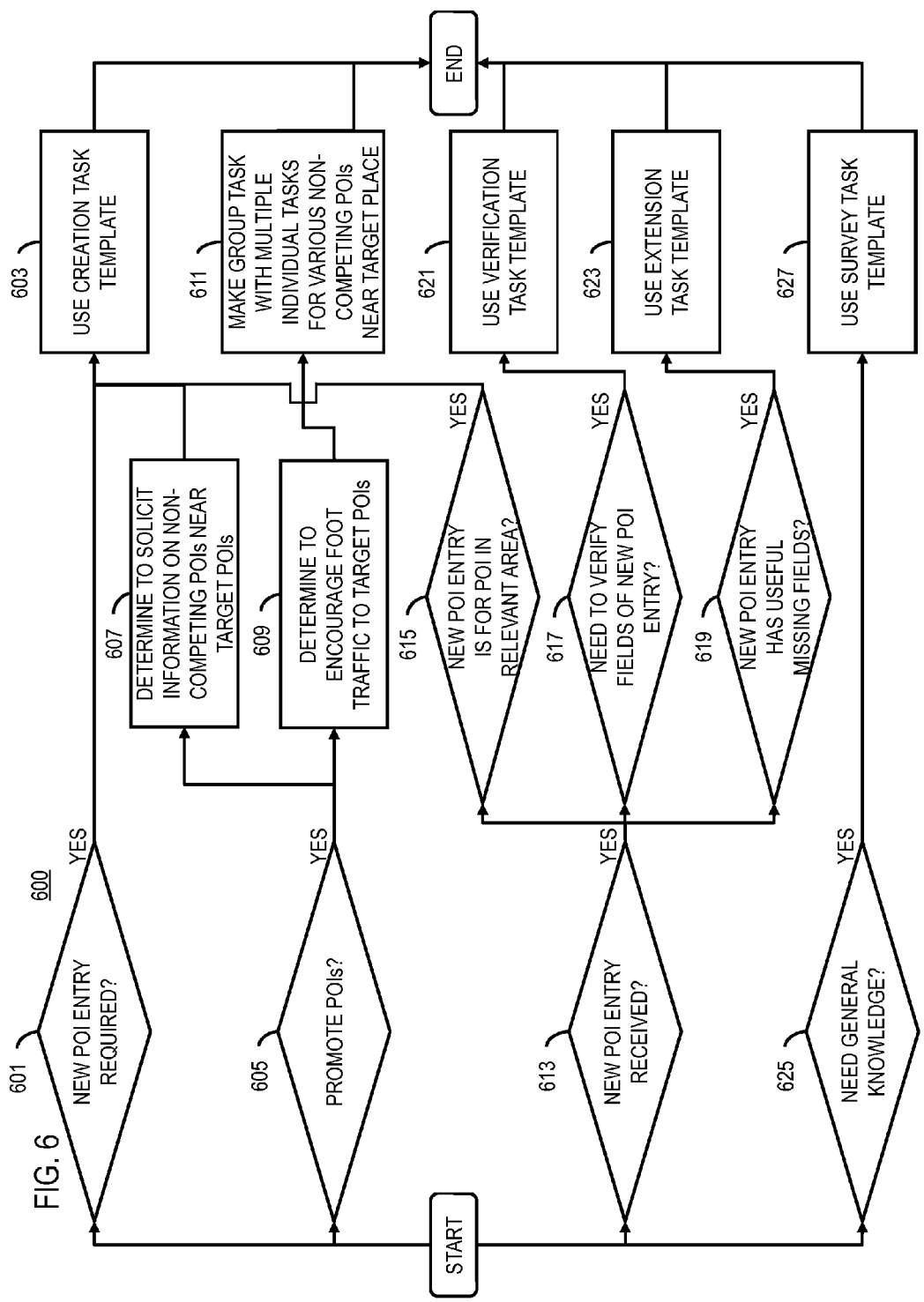

FIG. 8A
800

PLAYER 1 TASK ENTRY

TASK: FIND A CAR MAINTENANCE SHOP ON CARSON ROAD

NAME: DALE'S SHOP

ADDRESS: 765 CARSON ROAD, GREAT CITY, NY

PHONE NUMBER: (804) 123-4567

SUBMIT ANSWER

OPTIONS    EXIT

FIG. 8B
810

PLAYER 1 TASK ENTRY

TASK: FIND A DALE'S SHOP'S PHONE NUMBER

IS IT...
A. (804) 123-4567
B. (757) 837-3849
C. (703) 485-4876
D. (804) 739-3857
E. (450) 493-9872

A

SUBMIT ANSWER

OPTIONS    EXIT

FIG. 8C

PLAYER 1 TASK ENTRY 820

TASK: RECOMMEND 2 LOCAL SHOPPING CENTERS IN GREAT CITY, NY THAT CARRY VARIOUS AUTO PARTS — 721

SHOPPING CENTER 1: SQUIRE SHOPPING CENTER

SHOPPING CENTER 2: FOREST HILL SHOPPING CENTER

821

SUBMIT ANSWER

OPTIONS     EXIT

FIG. 8D

PLAYER 1 TASK ENTRY 830

TASK: FIND A DALE'S SHOP'S PHONE NUMBER AND 3 SIGNATURE SERVICES — 731

PHONE NUMBER: (804) 123-4567

SIGNATURE SERVICE 1: OIL CHANGE

SIGNATURE SERVICE 2: STATE INSPECTION

SIGNATURE SERVICE 3: CAR WASH

831

SUBMIT ANSWER

OPTIONS     EXIT

METHOD AND APPARATUS FOR PROVIDING INFORMATION COLLECTION USING TEMPLATE-BASED USER TASKS

BACKGROUND

Service providers and device manufacturers (e.g., wireless, cellular, etc.) are continually challenged to deliver value and convenience to consumers by, for example, providing compelling network services. One area of interest has been the development of service and technologies related to points of interest (POIs) (e.g., shops, restaurants, landmarks, etc.), especially as POI information is becoming increasingly valuable. Typically, such information is collected by sending out paid human agents to visit different POIs to gather information about those particular places. These human agents will, for instance, fill out forms with values for relevant fields, such as street name, street number, telephone number, etc, for the various POIs. Such an approach, however, is limited in the area of POIs covered due to limited budgets, and can involve significant costs associated with overhead and maintaining updated data. As such, in recent years, service providers have also relied on users to voluntarily provide POI information for POIs of the users' choosing. Under the free-range volunteer system, however, a service provider's collection of POI information heavily depends on the motivation and interest of the volunteer users to provide data in general, and on the unlikely chance that the users will submit data that satisfies the particular requirements of the service provider (e.g., new information, verification information, etc.).

SOME EXAMPLE EMBODIMENTS

Therefore, there is a need for an approach for effectively providing information collection using template-based user tasks.

According to one embodiment, a method comprises processing and/or facilitating a processing of partial information for insertion into one or more task templates to cause, at least in part, creation of one or more user tasks to verify, to extend, or a combination thereof the partial information according to one or more system requirements for information. The method also comprises causing, at least in part, a distribution of the one or more user tasks based, at least in part on the one or more system requirements, history information relating to participation of one or more users, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of partial information for insertion into one or more task templates to cause, at least in part, creation of one or more user tasks to verify, to extend, or a combination thereof the partial information according to one or more system requirements for information. The apparatus is also caused to distribute the one or more user tasks based, at least in part on the one or more system requirements, history information relating to participation of one or more users, or a combination thereof.

According to another embodiment, a computer-readable storage medium carries one or more sequences of one or more instructions which, when executed by one or more processors, cause, at least in part, an apparatus to process and/or facilitate a processing of partial information for insertion into one or more task templates to cause, at least in part, creation of one or more user tasks to verify, to extend, or a combination thereof the partial information according to one or more system requirements for information. The apparatus is also caused to distribute the one or more user tasks based, at least in part on the one or more system requirements, history information relating to participation of one or more users, or a combination thereof.

According to another embodiment, an apparatus comprises means for processing and/or facilitating a processing of partial information for insertion into one or more task templates to cause, at least in part, creation of one or more user tasks to verify, to extend, or a combination thereof the partial information according to one or more system requirements for information. The apparatus also comprises means for causing, at least in part, a distribution of the one or more user tasks based, at least in part on the one or more system requirements, history information relating to participation of one or more users, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 6 is a flowchart of a process for creating POI-related tasks, according to one embodiment;

FIGS. 8A-8E are diagrams of user interfaces for submitting answers to template-based tasks, according to various embodiments;

DESCRIPTION OF SOME EMBODIMENTS

Examples of a method, apparatus, and computer program for providing information collection using template-based user tasks are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
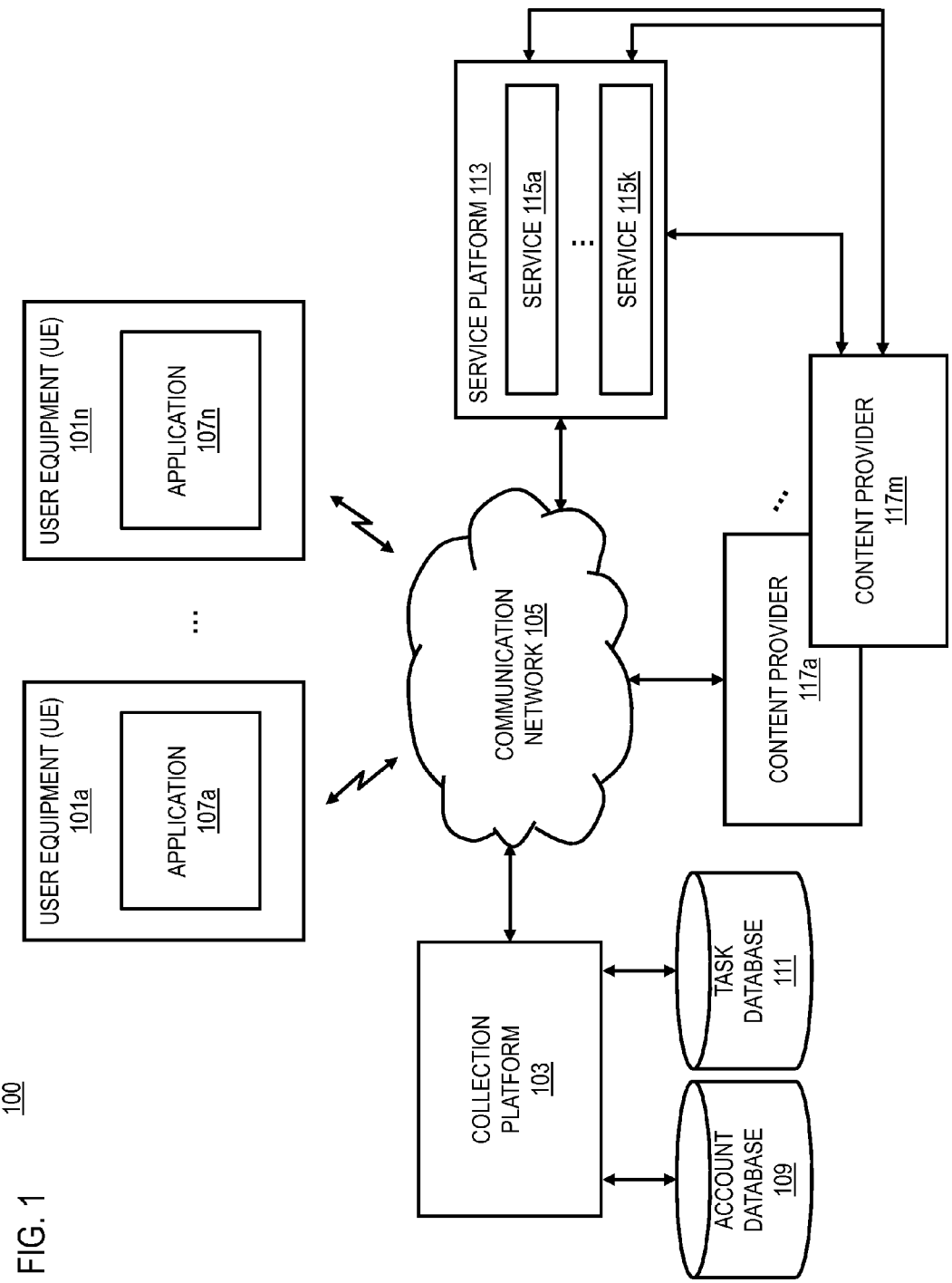
FIG. 1 is a diagram of a system capable of providing information collection using template-based user tasks, according to one embodiment.

FIG. 1 is a diagram of a system capable of providing information collection using template-based user tasks, according to one embodiment. As mentioned, POI information is becoming increasingly valuable. For example, a service provider with such a knowledge base can profit by offering valuable services to users, such as mapping, navigation, advertising, etc. One method of collecting such information is through the use of paid human agents who travel to different POIs and manually input data, such as street name, street number, telephone number, etc., for the various POIs. Such an approach, however, has many shortcomings, including limited covered area, lack of verification of submitted information, and insufficient updates due to high overhead and maintenance costs, limited budget, limited employees, etc. Another typical approach involves enabling users to voluntarily provide POI information. Generally, because users are not paid for their submissions, users pick and choose POIs that they wish to provide data about (as opposed to providing data based on the needs of the service provider). Consequently, under such an approach, a service provider's collection of POI information heavily depends on the motivation and interest of the volunteer users to provide data in general, and on the unlikely chance that users will submit data that meets the particular needs of the service provider.

To address this problem, a system 100 of FIG. 1 introduces the capability to provide information collection, for instance, by using template-based user tasks based on the particular needs of the system 100 for information (e.g., POI information, media content information, service information, etc.). Although various embodiments are described with respect to POI information, it is contemplated that the approach described herein may be used with other information, such as media content information, service information, etc. As used herein, the term "points of interest" (or "POIs") refers to specific geographic location points, places (e.g., areas, districts, regions, cities, etc.), shops/stores, etc., that may be of interest to one or more users. That is, the term "POIs" is not limited to single points of location, but can also refer to places (e.g., areas, districts, regions, cities, etc.), shops/stores, etc. In addition, although various embodiments are described with respect to gaming, or gamification of information collection, it is contemplated that the approach described herein may be used with any form of information collection. Specifically, the system 100 may process partial information for insertion into task templates to create user tasks to verify and/or extend the partial information according to system requirements for information. The system 100 may then distribute the user tasks based on the system requirements and/or history information relating to participation of users. In this way, the system 100 controls the creation and distribution of tasks to fit the needs of the system 100 (or of a particular service) to enable effective and efficient collection of information.

For the purpose of illustration, the task templates may include a variety of different formats (e.g., from which the user tasks are based) and may be for any number of purposes (e.g., to get new POI information, to get a telephone number for an existing POI entry, etc.). It is noted that while the purpose of particular task templates may be the same (e.g., to get a telephone number for an existing POI entry), the task templates may still be provided in different formats. These task template formats may, for instance, include fill-in-the-blanks, single answers, multiple answers to a single field or question, multiple choice answers, or a combination thereof. For example, a user task based on a fill-in-the-blank task template format may provide part of the POI information so that the user only needs to submit a subset of the fields for the POI (e.g., "Find the following place, and fill in the blanks: Joe's Pizza; <street#> MG Road, Palo Alto, Calif.; phone; <phone#>. To answer, send a text with <street#>, <phone#>.") A user task based on a single answer task template format may ask for one answer for one field of the POI information (e.g., "What is the name of the business at 321 MG Road in Palo Alto, Calif.," "True or False: The name of the business at 321 MG Road in Palo Alto, Calif. is called 'Joe's Pizza,'" "Please rate 'Joe's Pizza' at 321 MG Road in Palo Alto, Calif. from a scale of 1 to 10 where 1 is the worst and 10 is the best," etc.). A multiple answer task template format may expect multiple separate answers relating to a single field for the POI (e.g., "What are two cross-streets where Joe's Pizza is at 321 MG Road?," "List 5 local areas in Bangalore where there are a lot of good electronic shops," etc.). It is noted that the order of such answers, for instance, for multiple answer tasks may or may not matter depending on the particular task (e.g., "List 5 local areas in Bangalore where there are a lot of good electronic shops. Try to list them in order with the best area (with the most good shops) first.") A multiple choice task template format may include positive single answers (e.g., "Which one of these landmarks is closest to Joe's Pizza: A, B, C, or D?"), negative single answer (e.g., "Which one of these stores is not in Great Mall: A, B, C, or D?"), multiple answers (e.g., "Which of the following are an acceptable spelling for Marathahalli: A, B, C, and/or D?"), sorted multiple answers (e.g., "Which of the following are an acceptable spelling for Marathahalli (Arrange in Order of Preference): A, B, C, and/or D?"), multiple choice with free form (e.g., if the user answers with "None of the Above," the user may be allowed to submit a free-form text answer), etc.

Moreover, the various general types of user tasks may include extension tasks, verification tasks, survey tasks, group tasks, etc. Extension tasks may, for instance, include tasks designed to solicit new information from users (e.g., "Find an Italian restaurant on First Road, and submit its name, address, and phone number"). Verification tasks may include tasks designed to solicit answers from users for comparison with answers submitted from other users (e.g., "Find 'Joe's Pizza' on First Road, and submit its phone number"). Survey tasks may include tasks designed to generate statistics on popular answers to questions that may have no well-defined answer, more than one acceptable answer, etc. (e.g., "Recommend 3 local areas in Great City that has many good stores for buying auto parts"). Group tasks may include tasks that require users to perform tasks as a group. It is noted that group tasks may have several purposes, such as increasing active users of the information collection service (e.g., "Invite 3 new friends to join this game, and get 150 points"), encouraging group behavior or group traffic around a particular POI (e.g., for advertising or promotional purposes), or detecting associations between users (e.g., for avoiding distribution of related tasks to users who are friends to avoid collusion problems). Answers to group tasks may, for instance, be associated with the group based on the identities of the individual users (e.g., group associations are saved in user account information), on a group identifier in the answers, etc. It is further noted that the system 100 may also offer hybrid tasks, which may include any combination of extension tasks, verification tasks, survey tasks, group tasks, etc. Furthermore, the system requirements may, for instance, be based on need for new data (e.g., missing data on certain POIs, no data on particular POIs, etc.), need for verifying existing data (e.g., verifying POI name, address, telephone number, opening hours, etc.), etc. Additionally, or alternatively, the system requirements may include more frequent distributions of verification tasks than extension tasks, for instance, where accuracy of submitted information is of substantial priority. The following scenarios illustrate typical situations in which template-based tasks can be effectively utilized to collect information.

In one scenario, the system 100 may have a set of incomplete information with respect to a number of POIs for a certain area. To gather more information, a portion of the incomplete information may be processed to extract data from the portion for insertion into one or more task templates. As an example, the task templates may include one or more data fields where the extracted data may be inserted (e.g., "Find <sub-category> that is near <location>, and provide its <telephone number>," "The <sub-category>, <name>, is on <street name> in the city, <city name>, and has the phone number, <telephone number>", etc.). Some data fields may, for instance, be left blank after insertion of the extracted data for the user to fill in as a task (e.g., "The Italian restaurant, Joe's Italian Cafe, is on <street name> in the city, <city name>, and has the phone number, <telephone number>"). Additionally, or alternatively, all data fields may be filled in by the system 100 (e.g., "Find the Italian restaurant, Bob's Salad Shop, on Salad Street, and provide its phone number"). As discussed, the creation of the user tasks may be based on the system requirements for the information. If, for instance, the system 100 requires N times more verification tasks than extension tasks, and that particular threshold has not been reached, then more verification tasks will be created for distribution to users. As indicated, history information relating to the participation of the users may also be utilized to effectuate the needs of the system 100.

In another scenario, a user who is playing an information collection game for the first time initially registers with the system 100 (e.g., via short message service (SMS), via a web page, etc.), and submits contact and identifying information (e.g., username, name, phone number, etc.) together with his/her preferences (e.g., schedule for when to receive tasks, preferences regarding locations or topics of tasks, etc.). According to the user's preferences, along with system requirements, tasks may be selected from a pool of tasks (or generated on-the-fly according to a function using information about the user) and transmitted to the user. As mentioned, the user's participation history can be utilized to gauge how user tasks should be distributed to the user to satisfy the needs of the system 100. By way of example, after the user has completed several tasks accurately for a particular region, the user may be distributed tasks similar (or related) to those given to other users for the region. The user's previously accurate answers may, for instance, have caused the user to be labeled as a good source of POI information for the particular region. As such, the similar (or related) tasks may have been given to the user for the purpose of verifying the answers of the other users.

In yet another scenario, a generated user task relating to a particular POI may be based on the vicinity of another POI or another user task. As an example, the generated user task may be "Name the store in front of 'Fred's Pizza' on Main Street." As another example, the generated user task may be "Give a set of directions to 'Fred' Pizza on Main Street from Grand Station in Great City." In such a case, the generated user task may, for instance, be based on a fill-in-the-blank task template format (e.g., "From Grand Station's south exit, walk straight, turn left at [street name], walk straight until Main Street, and turn [left/right] at Main Street"), a multiple choice task template format (e.g., "From Grand Station's south exit (SELECT ONE): (A) Walk straight, turn left at South Street, walk straight until Main Street, and turn right at Main Street; (B) Ride South Street Bus to Main Street; (C) Both A and B"), or any other available task template format.

As shown in FIG. 1, the system 100 comprises a user equipment (UE) 101 (or multiple UEs 101a-101n) having connectivity to a collection platform 103 via a communication network 105. The UE 101 may include or have access to an application 107 (e.g., applications 107a-107n) to enable the UE 101 to interact with, for instance, the collection platform 103, which may: (1) process partial information for insertion into task templates to create user tasks according to system requirements for information; (2) distribute the user tasks based on the system requirements and/or history information relating to participation of users; (3) receive answers in response to the distribution of the user tasks; (4) process the answers and/or subsets of the answers to generate other partial information; (5) process the other partial information for creation of other user tasks; (6) or perform other functions. The collection platform 103 may include or have access to an account database 109 to access or store user account information, such as login information, contact information, user preferences, participation information, etc. The collection platform 103 may also include or have access to a task database 111 to access or store task templates, user tasks, collected information, or other information relating to the user tasks or distribution of the user tasks. Data stored in the account database 109 and the task database 111 may, for instance, be provided by the UEs 101, a service platform 113, one or more services 115 (or services 115a-115k), one or more content providers 117 (or content providers 117a-117m), and/or other services available over the communication network 105. For example, a certain service 115 may obtain POI information, media content information, service information, etc., from a particular content provider 117 to be used as partial information in the creation of user tasks. It is noted that the collection platform 103 may be a separate entity of the system 100, a part of the one or more services 115 of the service platform 113, or included within the UE 101 (e.g., as part of the application 107).

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the collection platform 103 may receive one or more answers in response to the distribution of the one or more user tasks, wherein the one or more answers relate to the one or more users tasks. The collection platform 103 may then process and/or facilitate a processing of the one or more answers, one or more subsets of the one or more answers, or a combination thereof to generate other partial information. In a further embodiment, the collection platform 103 may process and/or facilitate a processing of the other partial information for insertion into the one or more task templates to cause, at least in part, creation of one or more other user tasks. In one use case, users may submit answers to tasks that they are assigned. The answers may then be broken up into subsets and processed to generate new partial information. Additionally, or alternatively, subsets of a particular answer may be combined with other subsets of other answers to generate the new partial information. The new partial information may be then fed into a task template to generate new user tasks based on the system requirements. In particular, new questions (or tasks) may, for instance, be generated for a user by choosing a task template according to the desired outcome of the system 100 (or a service provider of the system 100), and then filling the task template with the new partial information derived from previous answer submissions by the user, other users, etc.

In another embodiment, the collection platform 103 may determine to validate at least one of the one or more answers based, at least in part, on at least another one of the one or more answers, wherein the at least one answer is associated with at least one of the one or more users. The collection platform 103 may then cause, at least in part, an assignment of one or more points, one or more items, or a combination thereof to the at least one user based, at least in part, on the validation. By way of example, a user may submit an answer for a user task recently assigned to the user. The answer may then be compared against other answers submitted by other users for similarly or related tasks to determine the accuracy and reliability of the user's answer. In some embodiments, the various answers used for comparison against the user's answer may be given different weights based on the participation history of the respective other users. For example, answers of users with a higher percentage of accuracy are likely to be given more weight than answers of users with a lower percentage of accuracy (e.g., 98% accuracy rate vs. 70% accuracy rate). Additionally, or alternatively, the user's answer may also be weighted when being compared against the other answers based on the user's participation history (e.g., the user's accurate rate for previously submitted answers). By way of another example, if the user's answer is validated, the user may be assigned points (e.g., reward points) or items (e.g., discount coupon) as a form of reward, incentive, etc., for submitting reliable or accurate answers.

In one scenario, the user may submit "Joe's Italian Cafe" as an answer to the question/task "The Italian restaurant, <name>, is on 123 Restaurant Road in the city, Great City." The answer "Joe's Italian Café" may then be compared against other answers that other users have submitted in response to similar questions/tasks (e.g., "What is the name of the Italian restaurant on 123 Restaurant Road in Great City?," "What is the name of the Italian restaurant across from 'Bob's Ice Cream Shop' on Restaurant Road in Great City?," etc.). If, for instance, a vast majority of these other answers matches the answer "Joe's Italian Café," then the user's answer may be determined to be reliable. As such, the user may be rewarded with an assignment of a predetermined amount of points (e.g., to be used to obtain items, financial incentives, etc.) or items (e.g., discount coupon, physical item, etc.) to the user's account for the answer submission. In this way, users are given additional incentives to response to user tasks which enable the continued collection and maintenance of POI information, media content information, service information, or other types of information.

In another embodiment, the collection platform 103 may cause, at least in part, a presentation with respect to the participation of the one or more users in one or more categories, one or more regions, or a combination thereof based, at least in part, on the assignment of the one or more points, the one or more items, or a combination thereof. As an example, various scoreboards may be posted based on the different categories and regions, and thereafter made accessible to all of the users. These scoreboard may, for instance, rank the users based on their total number of submitted answers and their accuracy rate (e.g., 100 submitted answers X 90% accuracy rate=90) with respect to all answers submitted, to answers submitted for user tasks relating to POIs, to answers submitted for user tasks relating to online services, to answers submitted for user tasks relating to POIs in Great City, etc. As such, users may compete with each other to be listed above one another on these various scoreboards (e.g., "gurus" of POIs in their town may want to demonstrate that they know their town). Consequently, such an approach may increase the number of participating users, the number of reliable answers, etc., which will in turn enable the continued collection of new and updated information.

In another embodiment, the collection platform 103 may determine one or more social groups associated with the one or more users, wherein the distribution of the one or more user tasks is further based, at least in part, on the one or more social groups. In one scenario, the social groups may be utilized to avoid inaccurate data, or collusion, by users. Related tasks may, for instance, be sparsely distributed among the social groups such that users of the same social group (or users of similar social groups) will not receive too many tasks that are related (or the same). Additionally, or alternatively, tasks may be assigned to users such that users of the same social groups (or users of similar social groups) will mostly, or only, be assigned unrelated tasks. Minimum or maximum threshold for distribution of the related (or unrelated) tasks may, for instance, include a number, a percentage, etc. of the related (or unrelated) tasks, and may be based on the particular social group (e.g., a "trusted" social group may have a higher maximum, a lower minimum, or no threshold). In another scenario, a user may be offered the opportunity to earn more rewards by inviting friends to join the same information collection service and/or to perform user tasks together with the user. Based on the invite, the collection platform 103 may determine that the users are in the same social network/group (e.g., the users may be labeled as friends). As with the first scenario, this social network/group information may be used to select a set of user tasks such that friends receive user tasks for different POIs (e.g., unrelated tasks). This information may, for instance, be done so that friends cannot collude by verifying each other's answers. As an example, if the collection platform 103 knows that users A, B, and C are friends, it can ensure that users A, B, and C are not given user tasks for verifying each other's answers. Using knowledge about social groups in this manner may, for instance, improve the quality of the data collected (e.g., by preventing collusion).

In another embodiment, the one or more user tasks may be distributed to the one or more users as part of at least one crowd sourcing game, and the partial information may include information relating to one or more POIs. In a further embodiment, the at least one crowd sourcing game may include a multi-player game, and the one or more users may be competing players in the multi-player game. In one use case, the players can compete with each other in terms of points. Each player may, for instance, be given a different set of user tasks, and the players may compete with each other to correctly complete their respective set of user tasks before the other players, or to correctly complete more user tasks of their respective set than the other players within a certain time limit (e.g., static or dynamic time limit). Additionally, or alternatively, the players can form groups, and these groups can compete with each other. As with the individual players, a set of user tasks can be given to each group, and the groups compete with one another by having their respective players perform user tasks as a team. Accordingly, the multi-player game can increase the competitive spirit of the players, either individually or as a team, which may also improve participation with respect to the user tasks.

By way of example, the UE 101, the collection platform 103, the service platform 113, the services 115, and the content providers 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
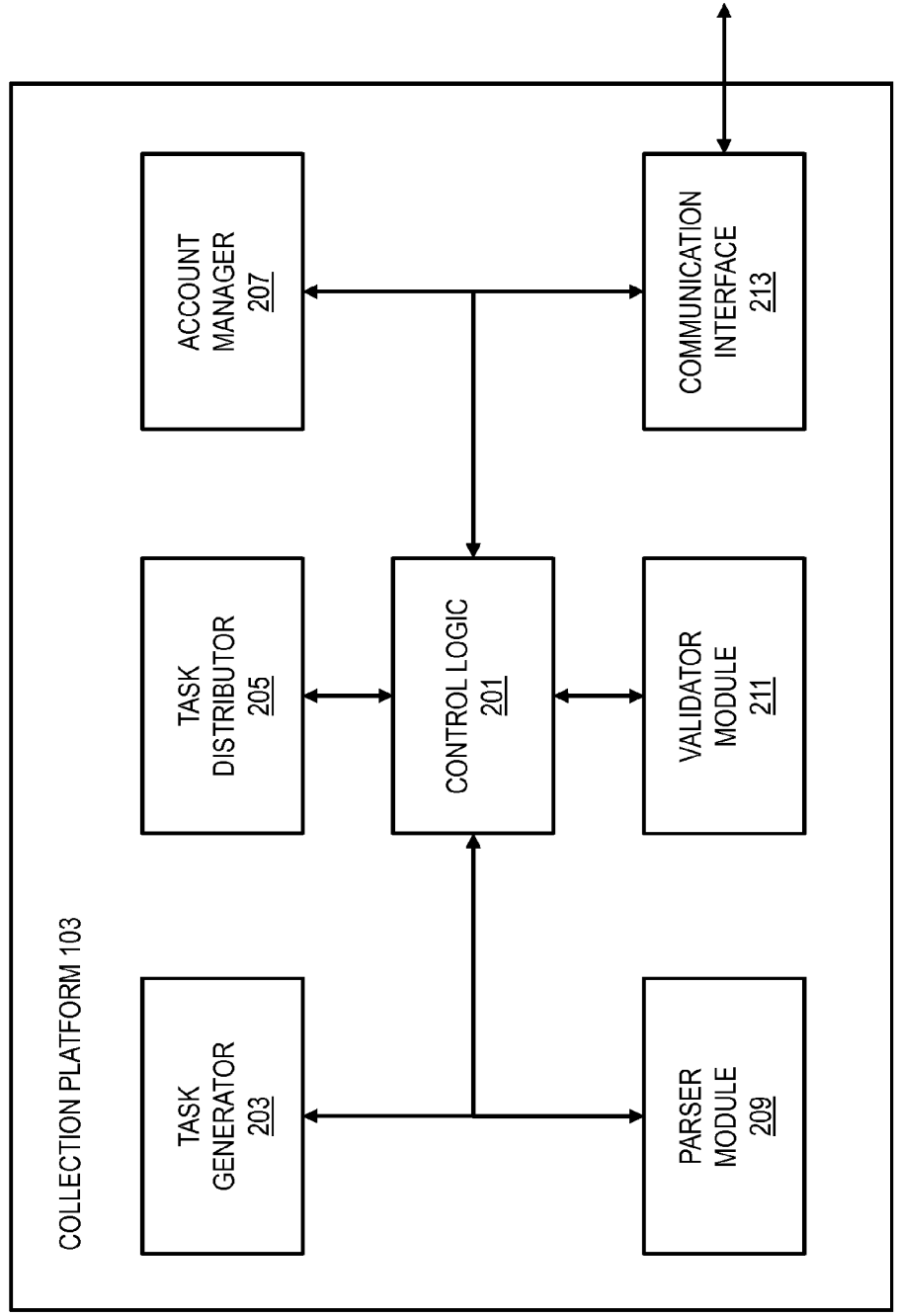
FIG. 2 is a diagram of the components of a collection platform, according to one embodiment.

FIG. 2 is a diagram of the components of a collection platform, according to one embodiment. By way of example, the collection platform 103 includes one or more components for providing information collection using template-based user tasks. It is contemplated that the functions of these components may be combined in one or more components or performed by other components of equivalent functionality. In this embodiment, the collection platform 103 includes control logic 201, a task generator 203, a task distributor 205, an account manager 207, a parser module 209, a validator module 211, and a communication interface 213.

The control logic 201 executes at least one algorithm for executing functions of the collection platform 103. For example, the control logic 201 may interact with the task generator 203 to process partial information for insertion into task templates to create user tasks to verify and/or to extend the partial information according to system requirements for information. The partial information may, for instance, be generated using previously submitted answers to distributed user tasks, or generated using "seed" information from another source (e.g., a certain service 115, a particular content provider 117, etc.). In one scenario, a service provider initially starting a POI collection service/game may seed the task generator 203 with the names of POI categories, street names or local areas in particular cities on which there is a lack of POI information, etc. This seed information may then be used to create creation tasks (which can be a sub-type of extension tasks) or survey tasks. As an example, the task template "Find a <sub-category> in <area name> area of <city name>" may be combined with seed information to create the user task, "Find an Italian Restaurant in the University Ave area of Palo Alto."

The task distributor 205 may then be directed to distribute the user tasks based on the system requirements and/or history information relating to participation of users. Certain user tasks may, for instance, be selected from a pool of the created user tasks for a particular user according to the user's preferences (e.g., preferred schedule, location or category preference, etc.), or the user tasks may be created on-the-fly for the user based on the system requirements and the user's preferences. As discussed, the user's participation history may also be utilized to determine how the user tasks should be distributed to the user to satisfy the system requirements (e.g., verification tasks may be distributed to the user based on the user's accuracy rating). The control logic 201 may also work with the account manager 207 to handle registration, account maintenance (e.g., contact information, preferences, etc.), authentications, participation history, rewards, etc., for one or more users. For example, the account manager 207 may keep track of a user's participation history, including assigned tasks, successfully completed tasks (e.g., validated answers), failed tasks (e.g., uncompleted tasks or inaccurate answers), and the user's rewards and/or ranking on scoreboards.

As discussed, each individual user task may, for instance, be created by selecting a task template from a list of different templates of various types (e.g., any combination of extension, verification, survey, group, etc.), and inserting the task template with partial information (e.g., partial POI information derived from the parser module 209 and the validator module 211). The selection of the task template and the partial POI information may, for instance, be according to a function that depends on what would be beneficial to the system 100 (e.g., given the needs of the system 100 for information). By way of example, the parser module 209 may receive (e.g., via the communication interface 213) an answer for a particular user task from a certain user. The answer may then be parsed by the parser module 209 to extract and separate the fields of data from the user's answer submission. In one use case, the user may submit an answer as follows: "FOUND Joe's Pizza, 341 MG Road, (555) 123-4567." This may then be parsed into several fields of data: name="Joe's Pizza," address="321 MG Road," phone="(555) 123-4567." The parsed data may subsequently be processed by the validator module 211 to determine whether the user's answer is considered reliable enough to be utilized by the system 100 and/or other services.

By way of another example, when a user submits data (e.g., an answer to a user task) on a previously unseen POI, a new POI Entry Candidate may be created. Additionally, or alternatively, when a user submits an answer to a task that has partial information referring to an existing POI Entry, the partial information is added to a collection of related partial information under each POI Entry Candidate. A POI Entry may, for instance, include an entry for a POI which has all of its required data fields (e.g., name, address, phone number, etc.) validated. On the other hand, a POI Entry Candidate may include an entry for a POI that does not currently have all of its required data fields validated. Thus, when the validator module 211 has collected enough agreeing answers from different users for each field, then the POI Candidate Entry can be considered validated, and the validated entry may be sent to the various services of the system 100, another system, etc., to be saved in their respective databases for their own purposes.

Moreover, as users submit answers, the validator module 211 may submit to the account manager 207 information relating to the user's answers, such as what task the user has answered, metadata on that task if known (e.g., time, location, etc.), the accuracy or reliability of the user's answer, etc. As indicated, such information (e.g., the user's participation history) may be utilized by the task distributor to select tasks for the particular user. Additionally, such information may be used to determine whether to give the user a reward (e.g., points, items, etc.) and/or feedback. These rewards and feedback may have public and private components. As an example, a public component may include a "scoreboard" or a "leaderboard" showing the achievements of the various users (e.g., listing the users who have submitted the most correct/useful answers). A private component may include redeemable points, discount coupons, etc.

Furthermore, the control logic 201 may also utilize the communication interface 213 to communicate with other components of the collection platform 103, the UEs 101, the service platform 113, the services 115, the content providers 117, and other components of the system 100. For example, the communication interface 213 may initiate or perform the distribution of the user tasks to the users, receive the answers to the user tasks, etc. The communication interface 213 may further include multiple means of communication. In one use case, the communication interface 213 may be able to communicate over short message service (SMS), multimedia messaging service (MMS), internet protocol, email, instant messaging, voice sessions (e.g., via a phone network), or other types of communication. As such, methods of receiving user tasks, submitting answers to user tasks, receiving information with respect to the scoreboards, etc., may be accomplished using basic messaging protocols, such as SMS, MMS, etc. Consequently, neither expensive mobile data network plans nor sophisticated devices are necessary for users to interact with the system 100. It is further noted that although location information applications/services (e.g., global position system (GPS)) may be useful for interfacing with the system 100, it is also not necessary for the users' devices (e.g., UEs 101) to have such capabilities to interact with the system 100 (e.g., to complete user tasks).

Figure 3:
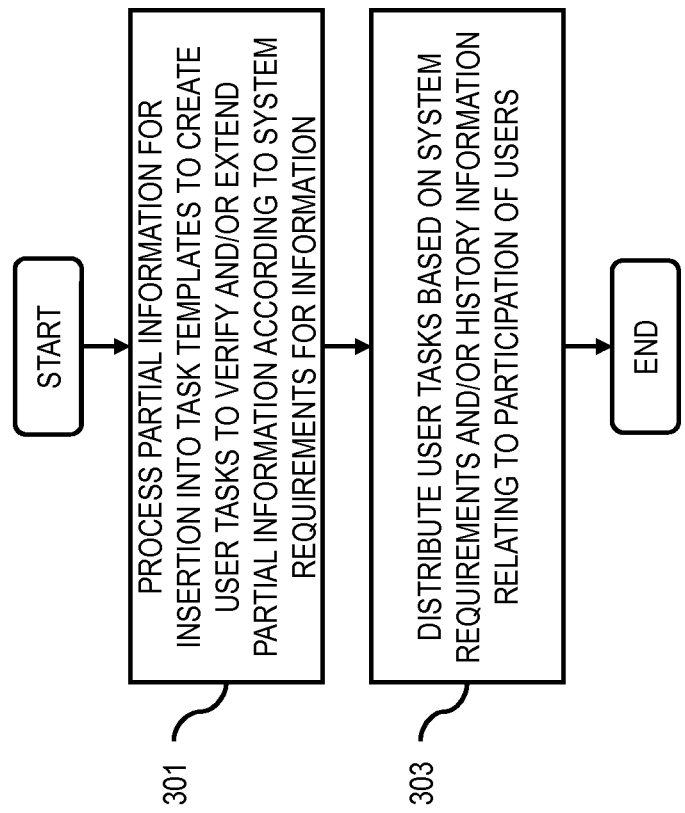
FIG. 3 is a flowchart of a process for providing information collection using template-based user tasks, according to one embodiment.
Figure 11:
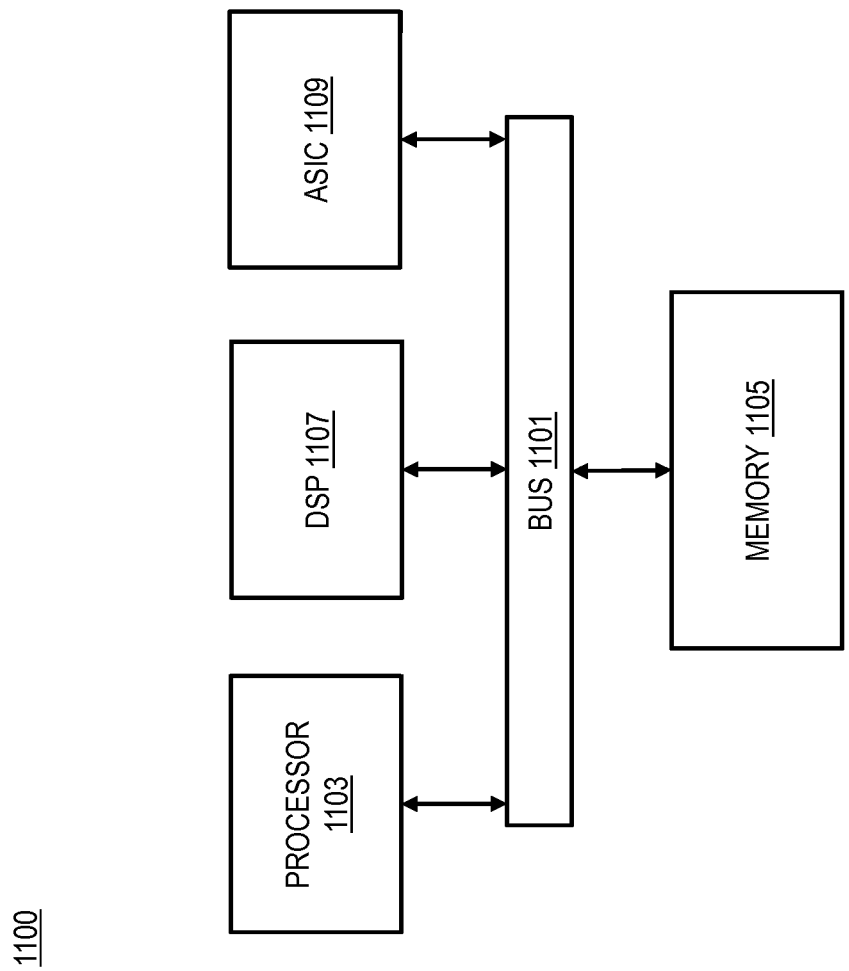
FIG. 11 is a diagram of a chip set that can be used to implement an embodiment of the invention.

FIG. 3 is a flowchart of a process for providing information collection using template-based user tasks, according to one embodiment. In one embodiment, the collection platform 103 performs the process 300 and is implemented in, for instance, a chip set including a processor and a memory as shown in FIG. 11. As such, the control logic 201 can provide means for accomplishing various parts of the process 300 as well as means for accomplishing other processes in conjunction with other components of the collection platform 103.

In step 301, the control logic 201 may process and/or facilitate a processing of partial information for insertion into one or more task templates to cause, at least in part, creation of one or more user tasks to verify, to extend, or a combination thereof the partial information according to one or more system requirements for information. As discussed, the one or more task templates (from which the one or more user tasks are based) may include any number of formats (e.g., fill-in-the-blanks, single answers, multiple answers, multiple choice answers, etc.), and may be for any variety of purposes (e.g., to get new POI information, to get a telephone number for an existing POI entry, etc.). In addition, the one or more user tasks may, for instance, include one or more extension tasks, one or more verification tasks, one or more survey tasks, one or more group tasks, or a combination thereof. The one or more system requirements may be based on need for new data (e.g., missing data on certain POIs, no data on particular POIs, etc.), need for verifying old data (e.g., verifying POI name, address, telephone number, opening hours, etc.), etc. By way of example, the one or more system requirements may include more frequent distributions of the one or more verification tasks than the one or more extension tasks.

In step 303, the control logic 201 may cause, at least in part, a distribution of the one or more user tasks based, at least in part on the one or more system requirements, history information relating to participation of one or more users, or a combination thereof. As discussed, a user's participation history may, for instance, be utilized to gauge how user tasks should be distributed to the user to satisfy the system requirements (e.g., verification tasks may be distributed to the user based on the user's accuracy rating). As such, because the creation and distribution of user tasks may be based on the system requirements, the effectiveness and efficiency with respect to collecting information from users may be increased. For example, as compared to a pure free-range volunteer system where users simply post answers of their choosing, user tasks may be created and distributed based on priority for certain information (e.g., no need for the same information that has already been verified many times within the same week).

Figure 4:
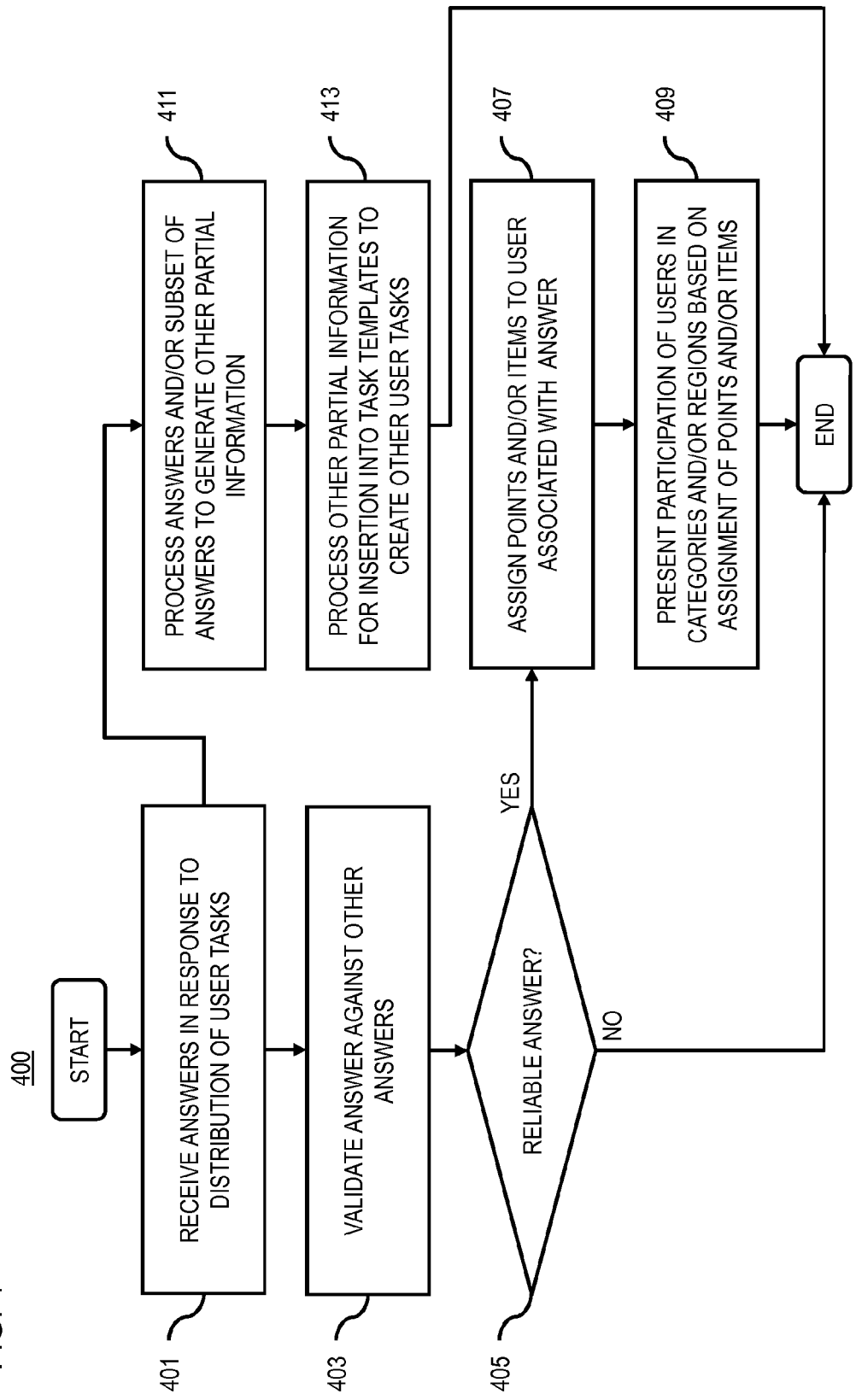
FIG. 4 is a flowchart of a process for processing answers to template-based user tasks, validating the answers, assigning points or items to users, or presenting user participation, according to one embodiment.

FIG. 4 is a flowchart of a process for processing answers to template-based user tasks, validating the answers, assigning points or items to users, or presenting user participation, according to one embodiment. In one embodiment, the collection platform 103 performs the process 400 and is implemented in, for instance, a chip set including a processor and a memory as shown in FIG. 11. As such, the control logic 201 can provide means for accomplishing various parts of the process 400 as well as means for accomplishing other processes in conjunction with other components of the collection platform 103.

In step 401, the control logic 201 may receive one or more answers in response to the distribution of the one or more user tasks, wherein the one or more answers relate to the one or more users tasks. The control logic 201 may then, at step 403, determine to validate at least one of the one or more answers against at least another one of the one or more answers, wherein the at least one answer is associated with at least one of the one or more users. As indicated, any number of techniques for validation may be used (e.g., matching a majority of the other answers of related tasks, weighted answers based on accuracy rates of associated users, etc.). Subsequently, the control logic 201 may, at step 405, determine whether the at least one answer is a reliable answer. If, for instance, it is determined that the at least one answer is reliable, the control logic 201 may, at step 407, cause, at least in part, an assignment of one or more points, one or more items, or a combination thereof to the at least one user based, at least in part, on the validation (e.g., the determination that the at least one answer is reliable). The control logic 201 may further, at step 409, cause, at least in part, a presentation with respect to the participation of the one or more users in one or more categories, one or more regions, or a combination thereof based, at least in part, on the assignment of the one or more points, the one or more items, or a combination thereof. As discussed, in one use case, users may be ranked based on the assignment of the points and/or the items, for instance, on one or more scoreboards. As an example, the scoreboards may reflect the rankings of the users based on the number, or the accuracy, of their answers in various subject matter, location areas, etc. Accordingly, users are may be encouraged to submit answers because of the entertainment and incentive values of the information collection service (e.g., of the system 100).

As shown, in step 411, the control logic 201 may additionally, or alternatively, process the at least one answer and/or subsets of the at least one answer to generate other partial information upon receipt of the at least one answer. The other partial information may then, at step 413, be processed for insertion into the one or more task templates to cause, at least in part, creation of one or more other user tasks. In this way, new user tasks may continue to be generated to verify or extend existing information for development of a diverse and rich data set (e.g., of POI information).

Figure 5:
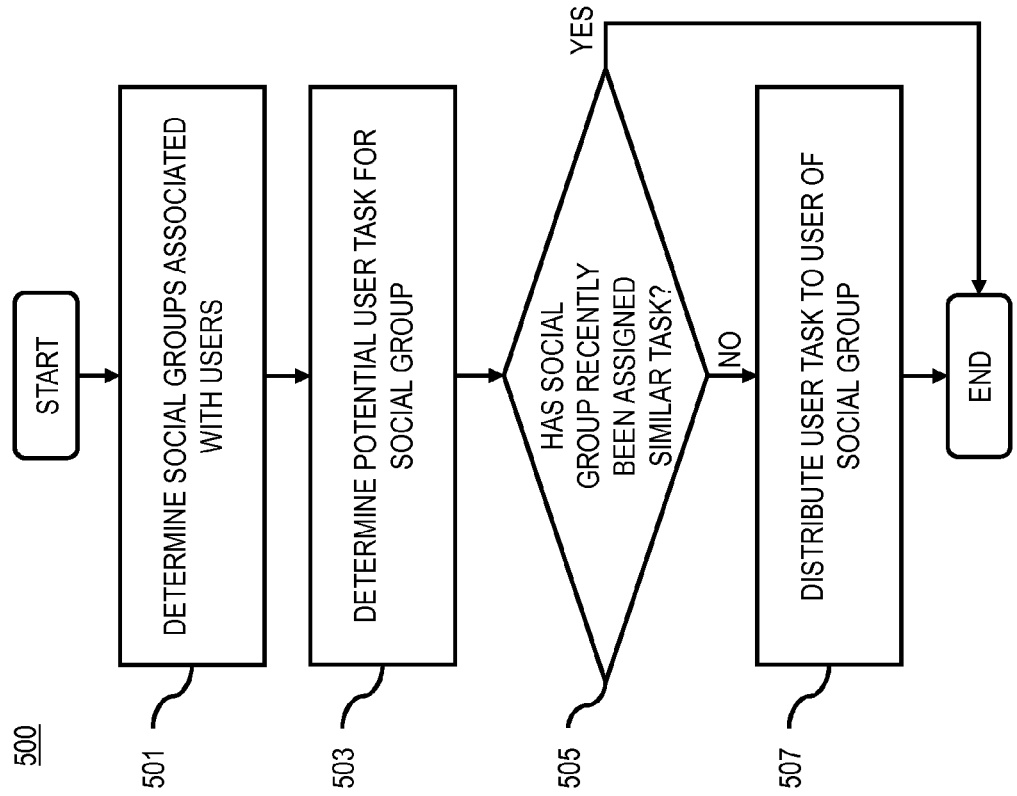
FIG. 5 is a flowchart of a process for utilizing social groups to distribute user tasks, according to one embodiment.

FIG. 5 is a flowchart of a process for utilizing social groups to distribute user tasks, according to one embodiment. In one embodiment, the collection platform 103 performs the process 500 and is implemented in, for instance, a chip set including a processor and a memory as shown in FIG. 11. As such, the control logic 201 can provide means for accomplishing various parts of the process 500 as well as means for accomplishing other processes in conjunction with other components of the collection platform 103.

In step 501, the control logic 201 may determine one or more social groups associated with the one or more users. By way of example, the one or more social groups may include one or more associations between the one or more users. If, for instance, users A, B, and C are determined to be friends with one another, then user A, B, and C may be determined to be in the same social group. The control logic 201 may then, at step 503, determine a potential user task for a particular social group of the one or more social groups.

At step 505, the control logic 201 may, for instance, determine whether the particular social group (or users of the social group) has recently been assigned a prior user task that is similar or related to the potential user task. If, for instance, it is determined that the particular social group has not been recently assigned a similar or related prior user task, then the potential user task may be distributed, at step 507, to a user of the social group. Otherwise, the control logic 201 may (1) withhold the user task from users of the social group for a predetermined threshold time (e.g., to avoid collusion), (2) the control logic 201 may distribute the user task to another social group that has not been recently assigned a similar or related user task, or (3) step 503 may be repeated with different parameters to generate different potential user tasks that are less similar to the recently assigned tasks. In this way, the control logic 201 may cause, at least in part, distribution of one or more user tasks to the one or more users based, at least in part, on the determination of the one or more social groups.

In some embodiments, the generation of the one or more user tasks may additionally, or alternatively, be based, at least in part, on the determination of the one or more social groups. As an example, if it determined that two friends are asking for new user tasks, the control logic 201 may intentionally generate two unrelated user tasks for the two friends. It is noted, however, that the two friends may not need to ask for the user tasks at the same time for such a determination to be made. For example, the control logic 201 may also check prior user tasks (e.g., previously assigned user tasks that have not been completed, completed tasks, etc.) of friends during the process of generating or choosing a user task for one of the friends.

In other embodiments, the determination of the one or more social groups may be utilized "passively" or "after-the-fact" in the validation phase. For example, if it is determined that two people are friends after they have already submitted their answers to their respective related user tasks, the control logic 201 may only count their answers as one vote, rather than two votes, for validation purposes (e.g., in determining the "right" answer, the control logic 201 may give less individual weight to each of the related answers submitted by friends).

FIG. 6 is a flowchart of a process for creating POI-related tasks, according to one embodiment. In one embodiment, the collection platform 103 performs the process 600 and is implemented in, for instance, a chip set including a processor and a memory as shown in FIG. 11. As such, the control logic 201 can provide means for accomplishing various parts of the process 600 as well as means for accomplishing other processes in conjunction with other components of the collection platform 103.

For example, if the control logic 201 determines, at step 601, that new POI entries are required (e.g., based on the system requirements), then the control logic 201 may select, at step 603, a creation task template to generate a creation/extension task (e.g., to look for POIs for which there are currently no entries or data). If the control logic 201 determines, at step 605, that certain POIs need to be promoted, the control logic 201 may determine, at steps 607 and 609, to solicit information on non-competing POIs near the target POIs or encourage foot traffic directly to the target POIs. As such, the control logic 201 may select, at step 603, a creation task template specifically for the target POIs to generate creation/extension tasks for POIs near the target POIs. The control logic 201 may also select, at step 611, a group task template to generate a group task with multiple individual tasks for various non-competing POIs near the target POIs.

In addition, if the control logic 201 determines, at step 613, that a new POI entry has been received, the control logic 201 may assess a number of various factors. As shown in steps 615, 617, and 619, the control logic 201 may determine whether the new POI entry is for a POI in a relevant area (e.g., if there is a desire for POI information in the particular area, the area may be relevant), whether there is a need to verify data fields of the new POI entry, whether the POI entry has useful missing fields, etc. If, for instance, the control logic 201 determines, at step 615, that the new POI entry is for a POI in a relevant area, the control logic 201 may select, at step 603, a creation task template to generate a creation/extension task for other POIs near the POI associated with the POI entry (e.g., to collect more data about the area). If the control logic 201 determines, at step 617, that there is a need to verify the data fields of the new POI entry, then the control logic 201 may select, at step 621, a verification task template to generate a verification task to validate the data fields of the new POI entry. If the control logic 201 determines, at step 619, that the new POI entry has useful missing data fields, the control logic 201 may select, at step 623, an extension task template to generate an extension task to obtain information for the missing data fields. Furthermore, if the control logic 201 determines, at step 625, that general knowledge is needed, then the control logic 201 may select, at step 627, a survey task template to generate a survey task to collect general information, for instance, about one or more regions, one or more categories, etc.

Figure 7B:
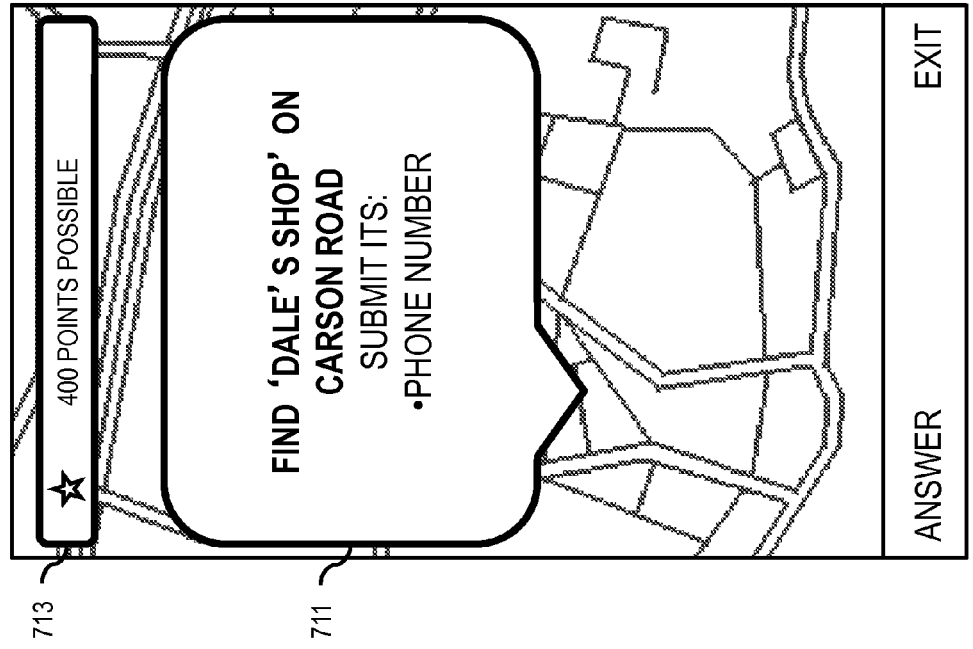
FIGS. 7A-7E are diagrams of user interfaces for template-based tasks, according to various embodiments.
Figure 7A:
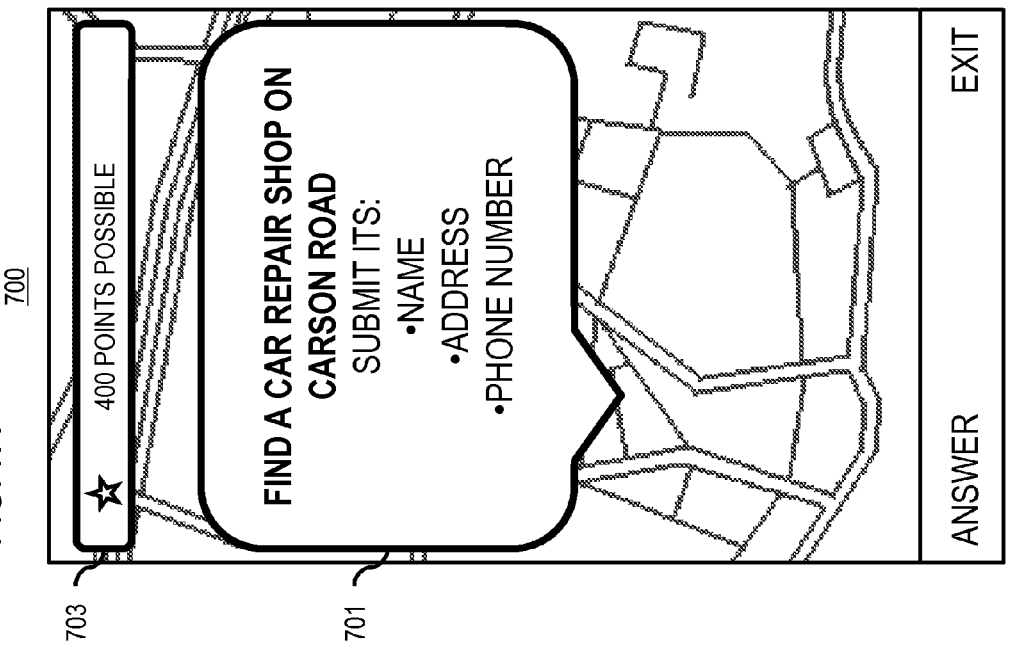

FIGS. 7A-7E are diagrams of user interfaces for template-based tasks, according to various embodiments. With respect to FIGS. 7A-7E, it is noted that although sophisticated user interfaces, applications, and protocols can be utilized by users to interact with the system 100, it is contemplated that simple user interfaces, applications, and protocols, such as those of SMS, MMS, etc., are sufficient for users to interact with the system 100. FIG. 7A features the user interface 700, which provides a first user with a user task 701 and corresponding rewards 703 for a reliable answer submission. As shown, the user task 701 asks the first user to "Find a car repair shop on Carson Road," and to submit the car repair shop's name, address, and phone number. FIG. 7B features the user interface 710, for instance, of a second user. The user interface 710 provides the second user with a user task 711 and corresponding rewards 713. As shown, the user task 711 asks the second user to "Find 'Dale's Shop' on Carson Road," and to submit its phone number. In this case, the user tasks 701 and 711 are related because the two user tasks are asking for information with respect to the same POI, or at the very least, for information with respect to car repair shops on the same road. In one scenario, the first user may have submitted an answer in response to the user task 701. The first user's answer may then have been processed to generate new partial information, which is thereafter utilized to create the user task 711. For example, the name "Dale's Shop" may have been inserted from the first user's answer into a task template to generate the user task 711. Subsequently, the user task 711 may have been provided to the second user for the purpose of using the second user's answer to verify the first user's answer (e.g., the user task 711 may be a verification task).

Figure 7C:
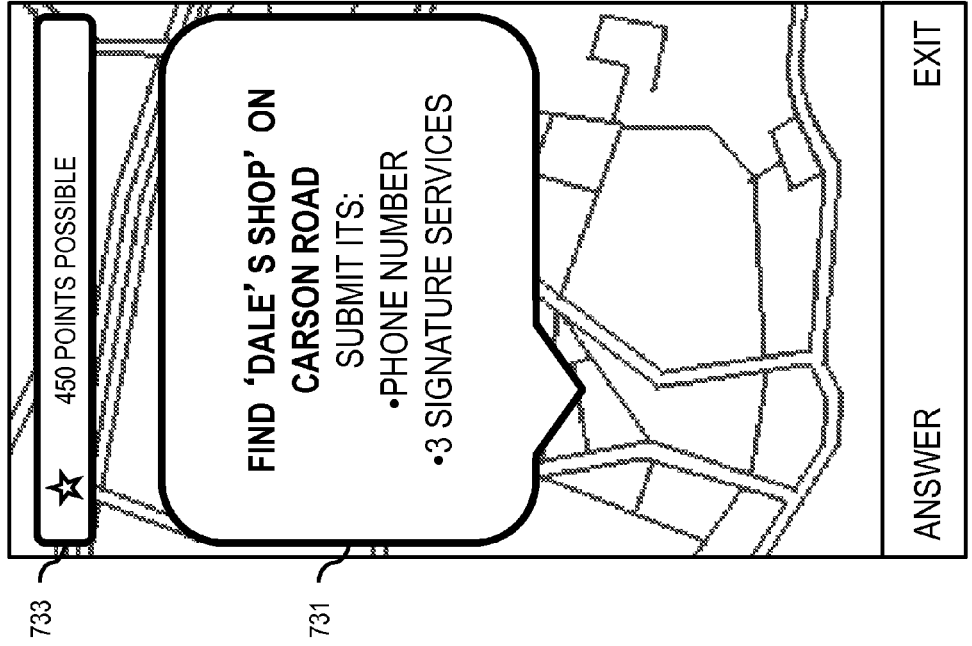
Figure 7D:
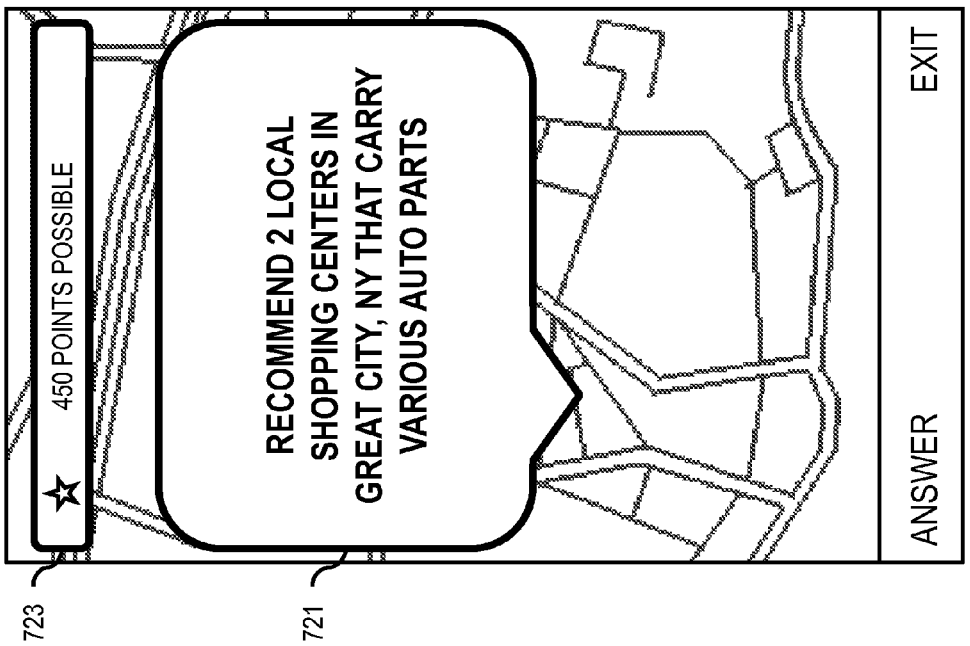
Figure 7E:
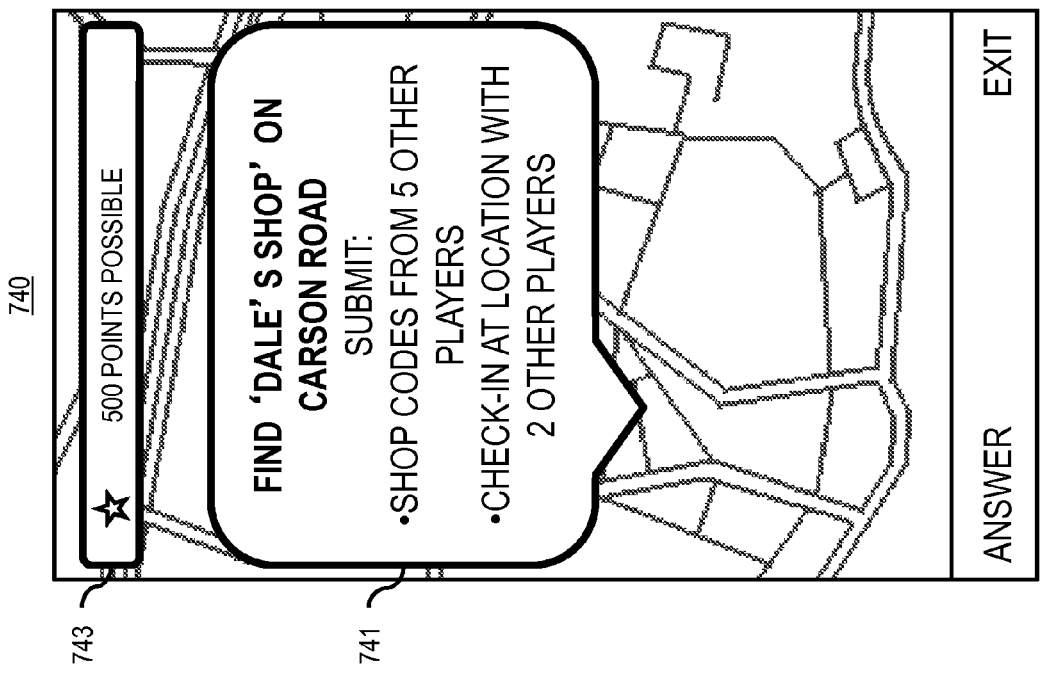

FIG. 7C features the user interface 720, for instance, of a third user. The user interface 720 provides the third user with a user task 721 and corresponding rewards 723. As depicted, the user task 721 asks the third user to "Recommend 2 local shopping centers in Great City, N.Y. that carry various auto parts." As such, the user task 721 may be an extension task, a verification task, a survey task, or a combination thereof, and may have multiple right answers. For example, an answer to the user task 721 may be used to discover new shopping centers in Great City, N.Y., to verify that certain shopping centers that carry various auto parts are indeed in Great City, N.Y., or to find out about the shopping centers in Great City, N.Y. that users personally recommend for auto parts. FIG. 7D features the user interface 730 for a fourth user. The user interface 730 provides the fourth user with a user task 731 and corresponding rewards 733. As illustrated, the user task 731 asks the fourth user to "Find 'Dale's Shop' on Carson Road," and to submit its phone number along with three of its signature services. As such, the user task 731 may be related to user task 701 and 711, and may be an extension task, a verification task, or a combination thereof. FIG. 7E features the user interface 740 for a fifth user. The user interface 740 provides the fifth user with a user task 741 and corresponding rewards 743. As shown, the user task 741 asks the fifth user to "Find 'Dale's Shop' on Carson Road," to submit shop codes for Dale's Shop (e.g., discount codes for various services at Dale's Shop) from five other players (e.g., users of a game), and to check-in with two other players. Thus, the user task 741 may be a group task (or some combination of a group task, extension task, verification task, or survey task) since the fifth user must "check-in" at the location associated with Dale's Shop with two other players.

Figure 8E:
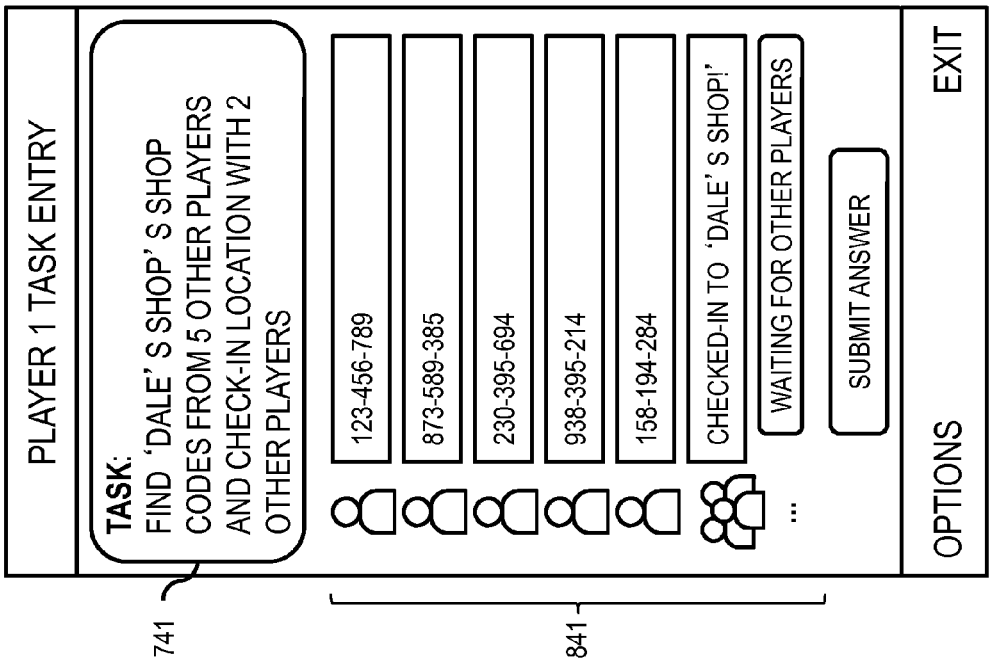

FIGS. 8A-8E are diagrams of user interfaces for submitting answers to template-based tasks, according to various embodiments. With respect to FIGS. 8A-8E, it is noted that although sophisticated user interfaces, applications, and protocols can be utilized by users to interact with the system 100, it is contemplated that simple user interfaces, applications, and protocols, such as those of SMS, MMS, etc., are sufficient for users to interact with the system 100. FIG. 8A features the user interface 800, which illustrates an answer 801 that may be submitted in response to the user task 701 of FIG. 7A. In this case, the first user is submitting the answer 801 to the user task 701 using a form provided by the user interface 800. As indicated, other methods of submitting the answer, such as via SMS, MMS, etc., may also be acceptable. FIG. 8B features the user interface 810, which illustrates an answer 811 that may be submitted in response to the user task 711 of FIG. 7B. As shown, the user task 711 requires that the second user submit the answer 811 by selecting one of the multiple choices (e.g., choices A-E).

FIG. 8C features the user interface 820, which illustrates an answer 821 in response to the user task 721 of FIG. 7C. As depicted, the third user has provided two shopping centers that the third user recommends for auto parts. As discussed, the answer 821 (e.g., Squire Shopping Center and Forest Hill Shopping Center) may not be the only right answer to the user task 721, but may be one of many answers that can be given (e.g., to receive the rewards 723). FIG. 8D features the user interface 830, which illustrates an answer 831 in response to the user task 731 of FIG. 7D. As with the answer 821, the answer 831 may not be the only right answer. For example, the fourth user may still successfully complete the user task 731 by submitting any other three services offered by Dale's Shop (e.g., in place of an oil change, a state inspection, and a car wash). FIG. 8E features the user interface 840, which illustrates an answer 841 in response to the user task 741. As shown, the fifth user has collected five shop codes for Dale's Shop from five other players. In one use case, the other players may have had to correctly respond to user tasks relating to Dale's Shop to receive the shop codes. Subsequently, the fifth user may have searched for the other players and contacted the other players to collect the shop codes. In addition to collecting the shop codes, the fifth user may also ask the other players to "check-in" to Dale's Shop by physically walking near Dale's Shop, or by submitting a "check-in" code from a shop clerk at Dale's Shop. As such, the user task 741 may entice the players to travel to Dale's Shop, providing increased traffic (and perhaps business) to Dale's Shop.

Figure 9:
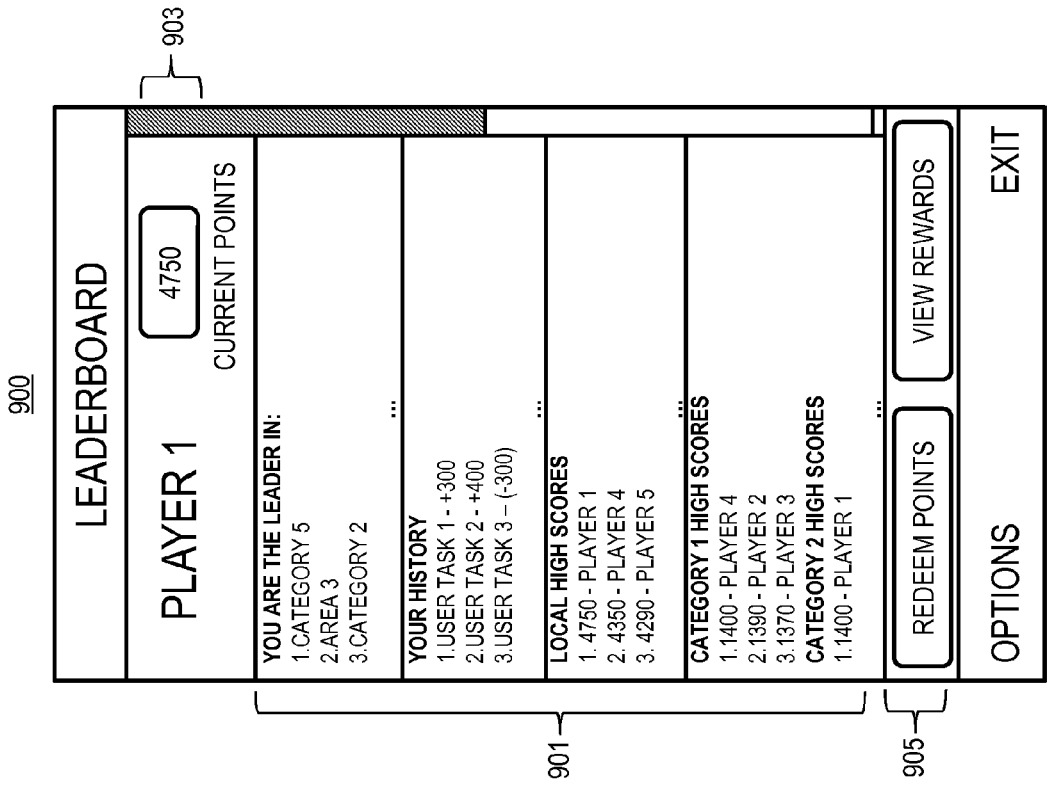
FIG. 9 is a diagram of a user interface for a leaderboard, according to one embodiment.

FIG. 9 is a diagram of a user interface for a leaderboard, according to one embodiment. FIG. 9 features a leaderboard 901, reward points indicator 903, and reward options 905 for Player 1. As discussed, leaderboards (or scoreboards) as well as a reward system may encourage further participation in the information collection service (or a game of the information collection service) and, thus, providing continued collection and updating of data for the information collection service. As depicted, the leaderboard 901 lists the categories and areas in which Player 1 is the leader (e.g., Player 1 has the highest number of points for the various categories or areas), Player 1's user task history (e.g., indicating the amount of points received for accurate answers or loss for inaccurate answers, local high scores (e.g., scores of players in the local area), and high scores in various categories or subject matter (e.g., types of POIs, media content, services, etc.). In one embodiment, the leaderboard 901 may list the various "leaders" (e.g., the players of the leaderboard 901) in sorted order (e.g., based on their respective scores). In another embodiment, the "local area" (or "local areas") for the local high scores may be based on a player's current location (e.g., Player 1's mobile phone may determine Player 1's current location), particular areas that a player chooses to "follow," areas that a player frequently plays in, etc. In addition, the user interface 900 allows Player 1 to redeem his/her reward points (e.g., currently at 4750 reward points), for instance, for various items, and also to view rewards (e.g., items) that can be redeemed at a later time.

The processes described herein for providing information collection using template-based user tasks may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
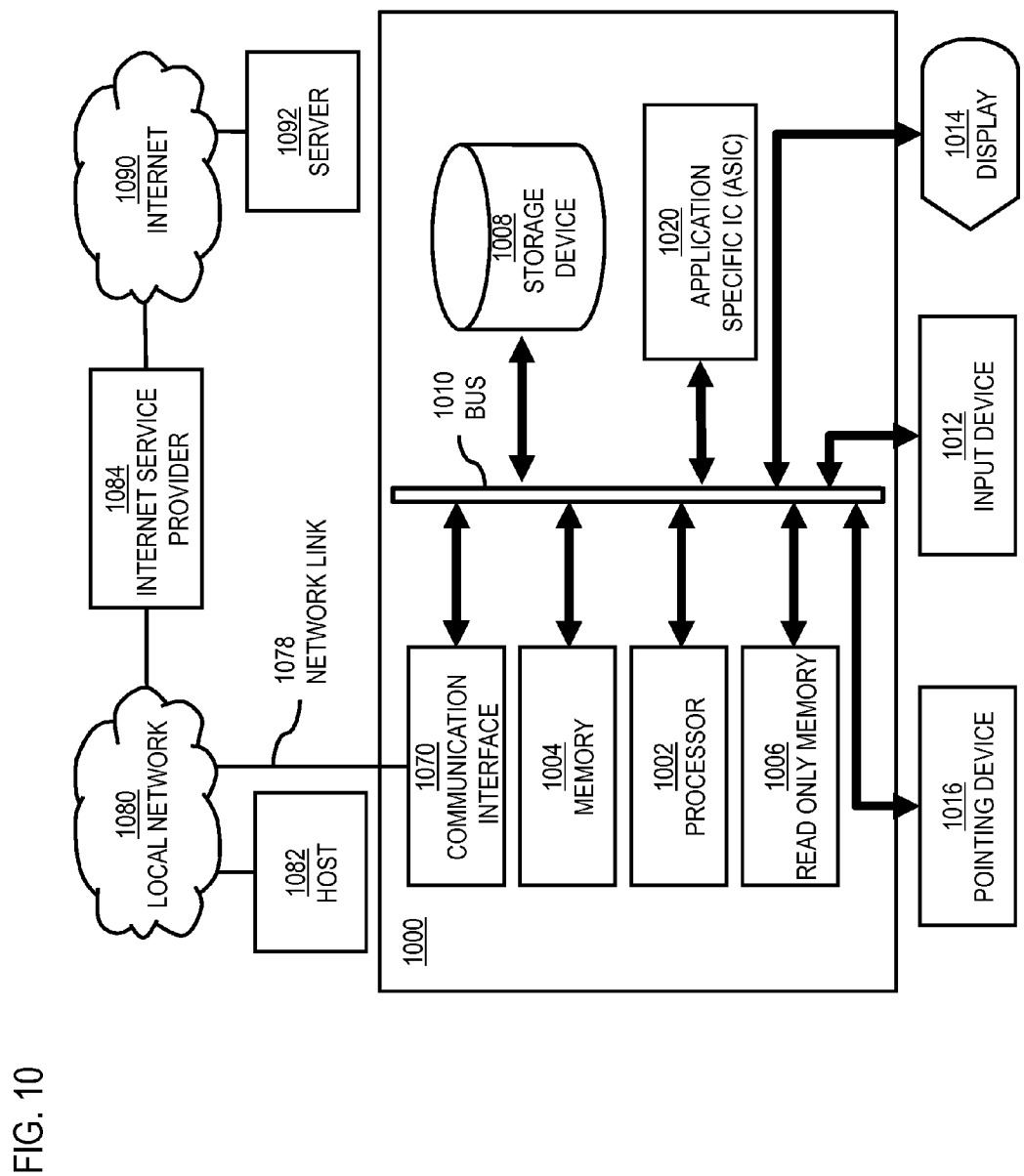
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to provide information collection using template-based user tasks as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of providing information collection using template-based user tasks.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to providing information collection using template-based user tasks. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or any other dynamic storage device, stores information including processor instructions for providing information collection using template-based user tasks. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing information collection using template-based user tasks, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for providing information collection using template-based user tasks to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to provide information collection using template-based user tasks as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of providing information collection using template-based user tasks.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide information collection using template-based user tasks. The memory 1105 also stores the data associated with or generated by the execution of the inventive steps.

Figure 12:
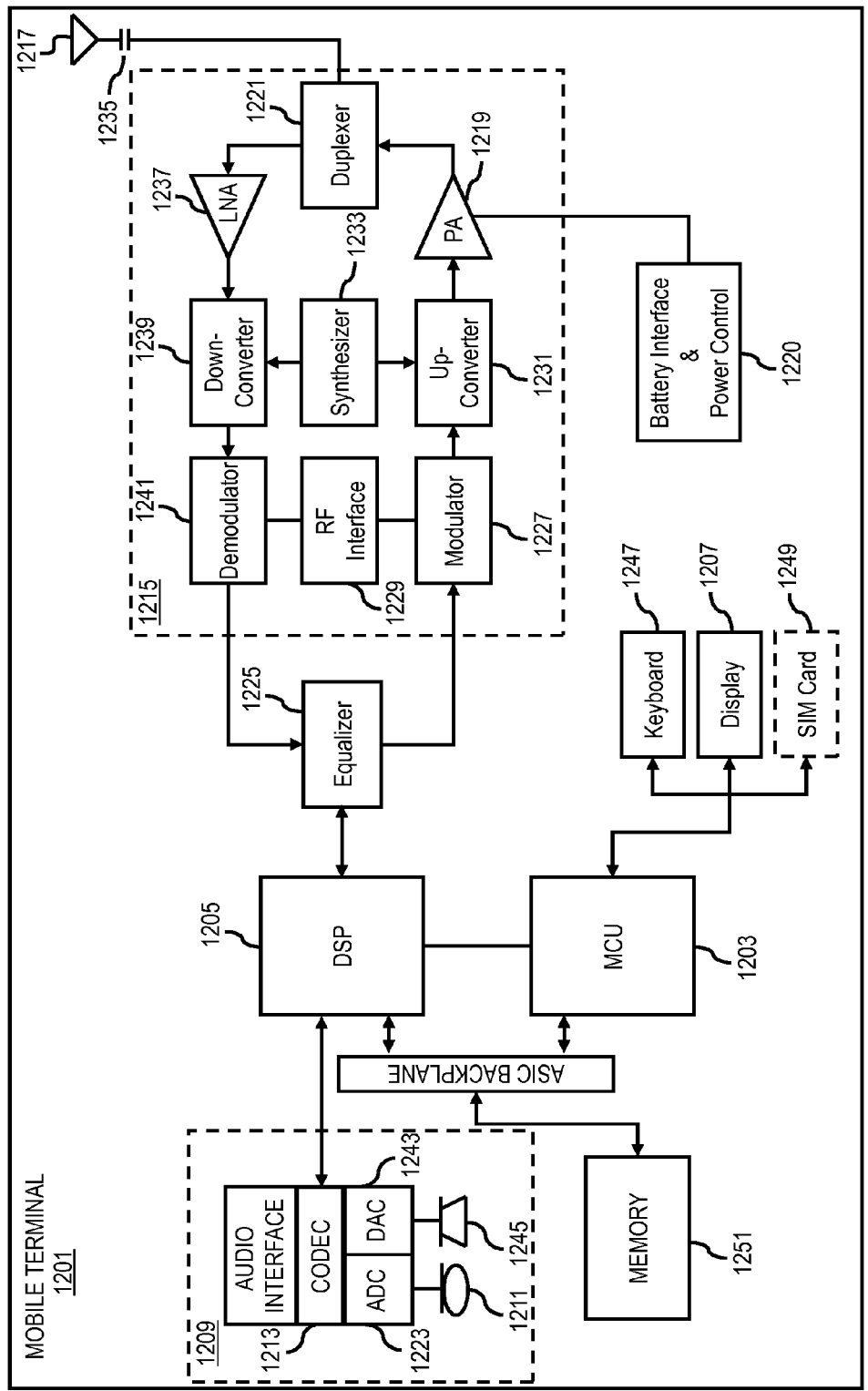
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of providing information collection using template-based user tasks. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory (ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of providing information collection using template-based user tasks. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to provide information collection using template-based user tasks. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    a processing of partial information relating to one or more real-world points of interest (POIs), by a processor, for insertion into one or more task templates;
    based, at least in part, on the one or more task templates, a creation of one or more user tasks including one or more user incentives to verify, to extend, or a combination thereof the partial information according to one or more system requirements for information of the one or more real-world POIs; and
    a distribution of the one or more user tasks based, at least in part on the one or more system requirements, history information relating to participation of one or more users, or a combination thereof.

2. A method of claim 1, wherein the (1) data and/or (2) information and/or (3) at least one signal are further based, at least in part, on the following:
    receipt of one or more answers in response to the distribution of the one or more user tasks, wherein the one or more answers relate to the one or more users tasks;
    verification of the partial information based, at least in part, on comparing the one or more answers against each other; and
    creation of updates of the one or more real-world POIs based, at least in part, on the verification of the partial information,
    wherein the one or more incentives are presented as part of at least one game, wherein the one or more user tasks include, at least in part, one or more extension tasks, one or more verification tasks, one or more survey tasks, one or more group tasks, or a combination thereof, one or more extension tasks, wherein the one or more extension tasks are created to solicit information of one or more new real-world POIs.

3. A method of claim 2, wherein the (1) data and/or (2) information and/or (3) at least one signal are further based, at least in part, on the following:
    further verification of the partial information based, at least in part, on one or more other answers submitted by one or more other users for related user tasks,
    wherein the one or more system requirements further include, at least in part, more frequent distributions of the one or more verification tasks than the one or more extension tasks.

4. A method of claim 2, wherein the (1) data and/or (2) information and/or (3) at least one signal are further based, at least in part, on the following:
    receipt of one or more answers in response to the distribution of the one or more user tasks, wherein the one or more answers relate to the one or more user tasks;
    a distribution of the one or more incentives to one or more of the users based, at least in part, on the verification of the partial information, the further verification of the partial information, or a combination thereof; and
    a processing of the one or more answers, one or more subsets of the one or more answers, or a combination thereof to generate other partial information.

5. A method of claim 4, wherein the (1) data and/or (2) information and/or (3) at least one signal are further based, at least in part, on the following:
    creation of the partial information based, at least in part, on information from one or more external sources, previously submitted answers to distributed user tasks, or a combination thereof,
    a processing of the other partial information for insertion into the one or more task templates to cause, at least in part, creation of one or more other user tasks.

6. A method of claim 4, wherein the (1) data and/or (2) information and/or (3) at least one signal are further based, at least in part, on the following:
    at least one determination to validate at least one of the one or more answers based, at least in part, on at least another one of the one or more answers, wherein the at least one answer is associated with at least one of the one or more users; and
    an assignment of one or more weighting points, one or more items, or a combination thereof to the at least one user based, at least in part, on the validation.

7. A method of claim 6, wherein the (1) data and/or (2) information and/or (3) at least one signal are further based, at least in part, on the following:
    a presentation with respect to the participation of the one or more users in one or more categories, one or more regions, or a combination thereof based, at least in part, on the assignment of the one or more weighting points, the one or more items, or a combination thereof.

8. A method of claim 6, wherein the (1) data and/or (2) information and/or (3) at least one signal are further based, at least in part, on the following:
    at least one determination of one or more social groups associated with the one or more users;
    wherein the one or more user tasks are further distributed based, at least in part, on the one or more social groups by distributing user tasks for different POIs to users of an identical social group, and reducing weights of answers to the user tasks for identical POIs by the users of the identical social group.

9. A method of claim 2, wherein the at least one game includes at least one crowd sourcing game.

10. A method of claim 9, wherein the at least one crowd sourcing game includes, at least in part, a multi-player game, and the one or more users are competing players in the multi-player game.

11. An apparatus comprising:
at least one processor; and
at least one memory including computer program code for one or more programs,
the at least one memory and the computer program code configured to, with the at least one processor, cause the apparatus to perform at least the following,
process and/or facilitate a processing of partial information relating to one or more real-world points of interest (POIs) for insertion into one or more task templates;
based, at least in part, on the one or more task templates, create one or more user tasks including one or more user incentives to verify, to extend, or a combination thereof the partial information according to one or more system requirements for information of the one or more real-world POIs; and
cause, at least in part, a distribution of the one or more user tasks based, at least in part, on the one or more system requirements, history information relating to participation of one or more users, or a combination thereof.

12. An apparatus of claim 11, wherein the one or more incentives are presented as part of at least one game, wherein the one or more user tasks include, at least in part, one or more extension tasks, one or more verification tasks, one or more survey tasks, one or more group tasks, or a combination thereof.

13. An apparatus of claim 12, wherein the one or more system requirements include, at least in part, more frequent distributions of the one or more verification tasks than the one or more extension tasks.

14. An apparatus of claim 11, wherein the apparatus is further caused to:
receive one or more answers in response to the distribution of the one or more user tasks, wherein the one or more answers relate to the one or more user tasks; and
process and/or facilitate a processing of the one or more answers, one or more subsets of the one or more answers, or a combination thereof to generate other partial information.

15. An apparatus of claim 14, wherein the apparatus is further caused to:
process and/or facilitate a processing of the other partial information for insertion into the one or more task templates to cause, at least in part, creation of one or more other user tasks.

16. An apparatus of claim 14, wherein the apparatus is further caused to:
determine to validate at least one of the one or more answers based, at least in part, on at least another one of the one or more answers, wherein the at least one answer is associated with at least one of the one or more users; and
cause, at least in part, an assignment of one or more points, one or more items, or a combination thereof to the at least one user based, at least in part, on the validation.

17. An apparatus of claim 16, wherein the apparatus is further caused to:
cause, at least in part, a presentation with respect to the participation of the one or more users in one or more categories, one or more regions, or a combination thereof based, at least in part, on the assignment of the one or more points, the one or more items, or a combination thereof.

18. A method of claim 1, wherein the (1) data and/or (2) information and/or (3) at least one signal are further based, at least in part, on the following:
determination of one or more target POIs among the real-world POIs to promote traffic therearound;
solicitation of information on one or more non-competing POIs among the real-world POIs that are near the one or more target POIs;
a processing of the information on the one or more non-competing POIs for insertion into one or more new task templates to cause, at least in part, creation of one or more new user tasks including one or more new user incentives to verify, to extend, or a combination thereof information relating to the one or more target POIs, wherein the one or more new incentives are presented as part of the at least one game; and
a distribution of the one or more new user tasks.

19. A method of claim 1, wherein the (1) data and/or (2) information and/or (3) at least one signal are further based, at least in part, on the following:
determination of a target geographic area to promote traffic therein;
a receipt of a new entry of one POI among the real-world POIs that are located within the target geographic area;
determination of one or more missing fields in the new entry of the POI that are useful for promoting the target geographic area; and
a retrieval of information on one or more non-competing POIs among the real-world POIs that are near the POI.

20. A method of claim 19, wherein the (1) data and/or (2) information and/or (3) at least one signal are further based, at least in part, on the following:
solicitation of information on the one or more non-competing POIs;
a processing of the information on the one or more non-competing POIs for insertion into one or more new task templates to cause, at least in part, creation of one or more new user tasks including one or more new user incentives to verify, to extend, or a combination thereof information relating to the one or more missing fields in the new entry of the POI, the POI, the target geographic area, or a combination thereof, wherein the one or more new incentives are presented as part of the at least one game; and
a distribution of the one or more new user tasks.

* * * * *